(12) United States Patent
Ko et al.

(10) Patent No.: US 8,472,566 B2
(45) Date of Patent: Jun. 25, 2013

(54) APPARATUS AND METHOD FOR TRANSMITTING PILOT SIGNAL IN WIRELESS COMMUNICATION SYSTEM

(75) Inventors: Eun-Seok Ko, Seongnam-si (KR);
Eun-Yong Kim, Hwaseong-si (KR);
Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1044 days.

(21) Appl. No.: 12/424,898

(22) Filed: Apr. 16, 2009

(65) Prior Publication Data

US 2009/0262846 A1    Oct. 22, 2009

(30) Foreign Application Priority Data

Apr. 18, 2008   (KR) .................. 10-2008-0036031

(51) Int. Cl.
*H04L 27/06* (2006.01)
*H04L 25/02* (2006.01)
*H04L 5/00* (2006.01)
*H04B 7/04* (2006.01)
*H04B 7/02* (2006.01)
*H04B 7/08* (2006.01)

(52) U.S. Cl.
CPC ........... *H04L 25/0202* (2013.01); *H04L 5/0048* (2013.01); *H04L 5/0007* (2013.01); *H04B 7/0413* (2013.01); *H04B 7/0452* (2013.01); *H04B 7/024* (2013.01); *H04B 7/0851* (2013.01); *H04B 7/086* (2013.01)
USPC ........... 375/340; 375/260; 375/267; 375/342; 375/346; 375/347; 375/348; 375/349; 370/328; 370/329; 370/338; 455/132; 455/272; 455/278.1; 455/296; 455/303; 455/450; 455/452.1

(58) Field of Classification Search
CPC ... H04L 5/0007; H04L 5/0048; H04L 25/0202; H04L 25/0204; H04L 25/0206; H04L 25/0208; H04L 25/0224; H04L 25/0226; H04L 25/0228; H04B 7/0413; H04B 7/0452; H04B 7/024; H04B 7/0408; H04B 7/0851; H04B 7/086
USPC ................. 375/316, 260, 267, 329, 340, 342, 375/346–349; 370/328, 329, 338; 455/132, 455/272, 278.1, 296, 303, 450, 452.1
See application file for complete search history.

(56) References Cited

U.S. PATENT DOCUMENTS

| 7,433,416 B1 * | 10/2008 | Banister ..................... 375/267 |
| 8,165,018 B2 * | 4/2012 | Jia et al. ..................... 370/229 |
| 2008/0075196 A1 | 3/2008 | Kim et al. |
| 2008/0212702 A1 * | 9/2008 | Pan et al. ..................... 375/260 |

FOREIGN PATENT DOCUMENTS

| KR | 10-2007-0101743 A | 10/2007 |
| KR | 10-2007-0103717 A | 10/2007 |

OTHER PUBLICATIONS

Taoka, Hidekazu et al., Investigation on Reference Signal Structure Suitable for MIMO Channel Transmission Using Precoding in Evolved UTRA Downlink, pp. 131-136.

* cited by examiner

*Primary Examiner* — Sam K Ahn
*Assistant Examiner* — Sophia Vlahos
(74) *Attorney, Agent, or Firm* — Jefferson IP Law, LLP

(57) ABSTRACT

An apparatus and method for reducing pilot overhead in a multi-antenna system are provided. The method generates postcodes and pre-codes for streams used to transmit signals to at least two receivers. The method allocates a pilot signal to at least one of the streams, and allocates an additional pilot signal shared by at least one of the streams. The method precodes the pilot signal allocated to at least one of the streams, the additional pilot signal, and data to be transmitted to each of the receivers, based on the pre-code for each of the streams, prior to transmission.

8 Claims, 6 Drawing Sheets

APPARATUS AND METHOD FOR TRANSMITTING PILOT SIGNAL IN WIRELESS COMMUNICATION SYSTEM

PRIORITY

This application claims the benefit under 35 U.S.C. § 119(a) of a Korean patent application filed in the Korean Intellectual Property Office on Apr. 18, 2008 and assigned Serial No. 10-2008-0036031, the entire disclosure of which is hereby incorporated by reference.

BACKGROUND OF THE INVENTION

1. Field of the Invention

The present invention relates to an apparatus and method for transmitting a pilot signal in a wireless communication system. More particularly, the present invention relates to an apparatus and method for reducing a pilot overhead in a multi-user multi-antenna system.

2. Description of the Related Art

Various multimedia services for a wireless environment are now being used or developed due to the rapid growth of mobile communication markets. In the wireless environment, a large amount of data is transmitted at a high rate in order to provide various multimedia services. Thus, research is being conducted on a multi-antenna system (e.g., a Multiple Input Multiple Output (MIMO) system) that can use finite frequency resources more efficiently.

In comparison with a single-antenna system, the multi-antenna system can increase the transmission reliability and the transmission rate even without an allocation of additional frequencies or transmit (TX) power by transmitting data through independent channels for the respective antennas. In addition, the multi-antenna system can further increase the frequency efficiency by allowing multiple users to simultaneously share the frequency resources through the spatial resources secured by multiple antennas. Hereinafter, the multi-antenna system allowing multiple users to share frequency resources will be referred to as a multi-user multi-antenna system.

The multi-user multi-antenna system uses a beamforming technique to eliminate inter-user interference. For example, the multi-antenna system may use a coordinated beamforming technique to eliminate an inter-user interference.

If the multi-antenna system uses a coordinated beamforming technique, a transmitter generates a pre-code and a postcode by using the downlink channel information of receivers enabled in a service area. Herein, the pre-code and the postcode have a vector value or a matrix value.

Also, the transmitter transmits an orthogonal dedicated pilot signal to each of the receivers so that the receivers can detect the postcode. For example, in order to transmit the pilot signal to two receivers, the transmitter allocates a pilot tone to each of the receivers by using a subchannel of a tile structure constructed as illustrated in FIG. 1.

FIG. 1 is a diagram illustrating a subchannel structure of a conventional wireless communication system.

Referring to FIG. 1, a wireless communication system constructs a subchannel with tiles arranged in a 4×3 matrix of frequency resources and time resources.

A transmitter allocates the first tone and the twelfth tone for a pilot signal of the first receiver and allocates the third tone and the tenth tone for a pilot signal of the second receiver so that the pilot signals of the receivers are orthogonal to each other.

In addition, the transmitter uses the tones other than the tones allocated for the pilot signals, for data transmission.

As described above, the transmitter allocates the orthogonal pilot signals to the respective receivers. Accordingly, the receiver estimates an effective channel on a stream-by-stream basis by using the pilot signal allocated by the transmitter. The receiver uses the estimated effective channel to generate a matched filter, and uses the generated matched filter as a postcode to detect an interference-free signal. Herein, the matched filter is the postcode that provides the maximum Signal to Interference and Noise Ratio (SINR).

Because the number of the antennas of a receiver is small in the coordinated beamforming technique, the multi-antenna system using the coordinated beamforming technique can simultaneously transmit as many streams as the number of the antennas of a transmitter. Thus, the transmitter recognizes receivers as receive (RX) antennas and simultaneously transmits streams to the receivers, thereby increasing the transmission rate.

However, as the number of the TX streams increases with an increase in the number of the receivers served by the transmitter, the use of resources for dedicated pilot signals allocated to the receivers increases linearly, which increases the ratio of the amount of radio resources used for pilot signal transmission to the amount of radio resources used for data transmission in the multi-antenna system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing pilot overhead in a multi-antenna system.

Another aspect of the present invention is to provide an apparatus and method for reducing a pilot overhead in a multi-antenna system using a coordinated beamforming technique.

Another aspect of the present invention is to provide an apparatus and method for a transmitter to allocate a pilot signal for a selected reference pre-code vector and a pilot signal including pre-codes of multiple users, in a multi-antenna system using a coordinated beamforming technique.

Another aspect of the present invention is to provide an apparatus and method for a receiver to detect a signal by means of a reference pilot signal and a pilot signal including pre-codes of multiple users, in a multi-antenna system using a coordinated beamforming technique.

In accordance with an aspect of the present invention, a method for transmitting signals at a transmitter of a multi-antenna system is provided. The method includes generating postcodes and pre-codes for streams used to transmit signals to at least two receivers, allocating a pilot signal to at least one of the streams, allocating an additional pilot signal shared by at least one of the streams, and preceding the pilot signal allocated to at least one of the streams, the additional pilot signal, and data to be transmitted to each of the receivers, based on the pre-code for each of the streams, prior to transmission.

In accordance with another aspect of the present invention, a method for detecting a signal at a receiver of a multi-antenna system is provided. The method includes estimating a channel based on first pilot signals received through at least two streams and a second pilot signal shared by the streams, generating a vector orthogonal to the channel estimated based on the first pilot signal, if the first pilot signal is not the pilot signal allocated to the stream of the receiver, generating a postcode based on the orthogonal vector, estimating a channel gain based on the postcode and the channel estimated based on the second pilot signal, and detecting a signal based on the postcode and the channel gain.

In accordance with another aspect of the present invention, a transmitting apparatus of a multi-antenna system is provided. The apparatus includes at least two antennas, a channel detector for detecting downlink channel information of at least two receivers located in a service area, a weight generator for generating, based on the downlink channel information, postcodes and pre-codes for streams used to transmit signals to the receivers, a pilot controller for allocating a pilot signal to at least one of the streams and for allocating an additional pilot signal shared by at least one of the streams, and a pre-coder for preceding the pilot signal allocated to at least one of the streams, the additional pilot signal, and data to be transmitted to each of the receivers, based on the pre-code for each of the streams.

In accordance with another aspect of the present invention, a receiving apparatus of a multi-antenna system is provided. The apparatus includes a channel estimator for estimating a channel based on first pilot signals and a second pilot signal received through at least two streams, a postcode generator for generating a postcode based on a vector orthogonal to a channel estimated based on the first pilot signal, if the first pilot signal is not the pilot signal allocated to the stream of the receiving apparatus, and for generating a postcode based on a channel estimated based on the first pilot signal, if the first pilot signal is the pilot signal allocated to the stream of the receiving apparatus, a channel gain estimator for estimating a channel gain based on the pre-code and the channel estimated based on the first pilot signal or the second pilot signal, a postcoder for postcoding a received signal based on the generated postcode, and an equalizer for equalizing the postcoded signal based on the estimated channel gain.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
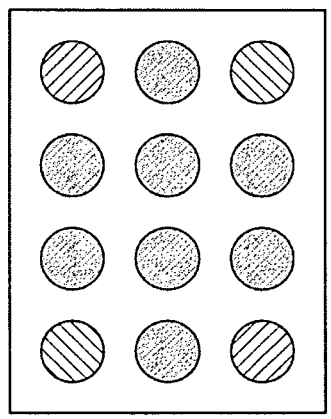
FIG. 1 is a diagram illustrating a subchannel structure of a conventional wireless communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a scheme for reducing pilot overhead in a multi-user multi-antenna system.

In the multi-antenna system, a transmitter allocates a pilot signal including a reference pre-code vector and a pilot signal including pre-codes of multiple users. Herein, the transmitter determines a pilot signal of a number of streams that is one less than the number of antennas of a receiver as the pilot signal including the reference pre-code vector, and allocates an additional pilot signal as the pilot signal including the pre-codes of the multiple users.

The following description is made on the assumption that receivers have two antennas. Thus, the transmitter allocates a pilot signal including a reference pre-code vector and a pilot signal including pre-codes of multiple users. Even if the receivers have three or more antennas, the transmitter may allocate pilot signals in substantially the same way as described above.

The following description is made on the assumption that the channel of the multi-antenna system changes slowly and has flat fading characteristics.

It is also assumed that the multi-antenna system uses a coordinated beamforming technique to eliminate an inter-receiver interference. Herein, the transmitter may transmit several streams to each receiver. However, the following description is made on the assumption that the transmitter transmits one stream to each receiver in consideration of the multi-user diversity and the correlation between the antennas of the receiver.

In the case of using the coordinated beamforming technique, the transmitter generates a pre-code and a postcode by using the downlink channel information of the receivers enabled in the service area. Herein, the transmitter generates the pre-code and the postcode so that the effective channels estimated by the receivers are orthogonal to each other as illustrated in FIG. 2.

Figure 2A:
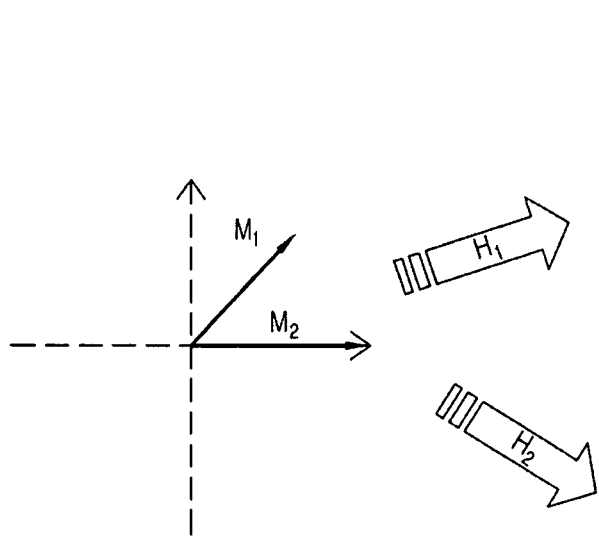
FIGS. 2A and 2B are diagrams illustrating an effective channel of a wireless communication system according to an exemplary embodiment of the present invention.
Figure 2B:
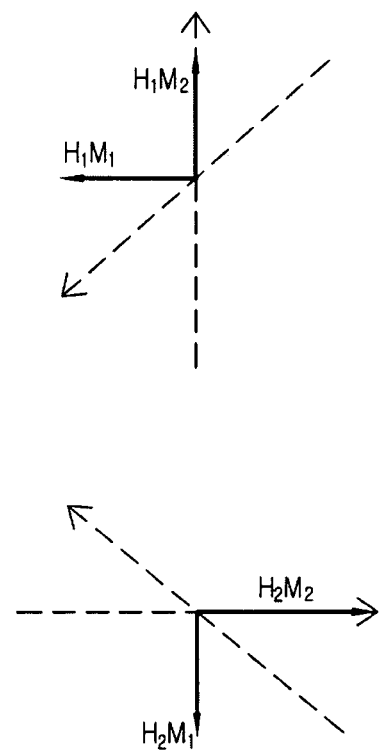

FIGS. 2A and 2B are diagrams illustrating an effective channel of a wireless communication system according to an exemplary embodiment of the present invention.

Referring to FIGS. 2A and 2B, in the case of using the coordinated beamforming technique, the transmitter does not use a unitary matrix when generating the pre-code. Thus, a pre-code $M_1$ of the first receiver and a pre-code $M_2$ of the second receiver, which are generated by the transmitter, are not orthogonal to each other, as illustrated in FIG. 2A. The transmitter generates the pre-codes of the receivers so that the effective channels estimated by the receivers based on the signal precoded/transmitted by the transmitter are orthogonal to each other.

Thus, the effective channels estimated by the receivers based on the pilot signal precoded/transmitted by the transmitter are orthogonal to each other, as illustrated in FIG. 2B.

As described above, in the case of using the coordinated beamforming technique, the effective channels of the signals precoded/transmitted by the transmitter are orthogonal to each other in the receiver. Thus, based on the orthogonality between the effective channels, the receiver may estimate its own effective channel by using the effective channel of another receiver.

Accordingly, the transmitter allocates a pre-code vector of a reference stream to a reference pilot signal prior to transmission. That is, the transmitter allocates a pilot signal to only a reference stream and precodes/transmits the stream, thus making it possible to reduce pilot overhead. Upon receiving a signal through the reference stream, the receiver generates a postcode vector based on the effective channel estimated using the pilot signal of the reference stream.

On the other hand, upon receiving signals through streams other than the reference stream, the receivers estimate their own effective channels based on the effective channel estimated using the pilot signal of the reference stream. Thereafter, the receivers generate postcode vectors based on the estimated effective channels.

Thereafter, the receivers use the generated postcode vectors to postcode the RX signals in order to eliminate the interference with signals intended for other receivers.

In this case, the receivers can eliminate the interference with signals intended for other receivers but cannot compensate for the channel distortions of their own signals. The receivers estimate the channel gains of the postcoded signals in order to compensate for the channel distortions of the RX signals.

Accordingly, the transmitter allocates an additional pilot signal so that the receivers can estimate the channel gains of the postcoded signals. For example, the transmitter may allocate an additional pilot signal that includes pre-code vectors of all the users served by the receivers. As another example, the transmitter may allocate an additional pilot signal that includes pre-code vectors of users other than the users allocated the reference pilot signal, among all the users served by the receivers. Herein, because one stream is transmitted to each user, the pre-code vectors of the multiple users correspond to the pre-code vectors of the respective streams.

Hereinafter, a description is given of a structure of a transmitter for transmitting a reference pilot signal and an additional pilot signal.

Figure 3:
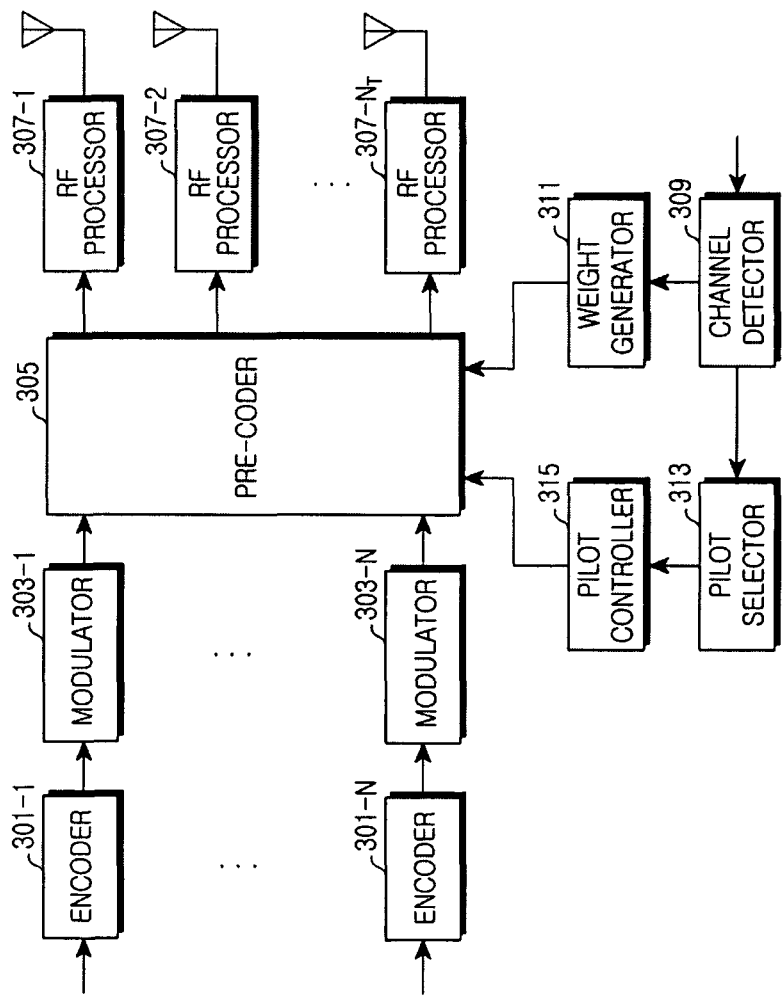
FIG. 3 is a block diagram of a transmitter in a wireless communication system according to an exemplary embodiment of the present invention.

FIG. 3 is a block diagram of a transmitter in a wireless communication system according to an exemplary embodiment of the present invention.

Referring to FIG. 3, the transmitter includes encoders 301-1 to 301-N, modulators 303-1 to 303-N, a pre-coder 305, Radio Frequency (RF) processors 307-1 to 307-$N_T$, a channel detector 309, a weight generator 311, a pilot selector 313, and a pilot controller 315.

Each of the encoders 301-1 to 301-N encodes TX data, which is to be transmitted to each receiver, according to a Modulation and Coding Scheme (MCS) level suitable for the channel state of each receiver, and outputs the encoded signal to each of the modulators 303-1 to 303-N.

Each of the modulators 303-1 to 303-N receives the encoded signal from each of the encoders 301-1 to 301-N, modulates the encoded signal according to the MCS level suitable for the channel state of each receiver, and outputs the modulated signal to the pre-coder 305.

The pre-coder 305 receives a pre-code from the weight generator 311 and the modulated signals from the modulators 303-1 to 303-N, precodes the modulates signal by the pre-code, and outputs the precoded signals to the RF processors 307-1 to 307-$N_T$ connected respectively to antennas.

The channel detector 309 detects the channel state of a downlink for transmitting data to the receivers located in a service area. For example, the channel detector 309 estimates the channel state of streams based on a sounding signal transmitted by the receivers. As another example, the channel detector 309 may detect the channel state information included in the feedback signal provided from the receivers.

Based on the channel information provided from the channel detector 309, the weight generator 311 generates a pre-code for transmitting data through each stream and a postcode of the receivers that have received data through the respective streams. Herein, the weight generator 311 generates the pre-code and the postcode for each receiver so that the effective channels estimated by the receivers based on the precoded signals are orthogonal to each other.

The pilot selector 313 selects a reference stream for allocation of a pre-code vector to a reference pilot signal, among the streams for transmission of data to the receivers located in the service area. That is, the pilot selector 313 selects a reference stream to be allocated a reference pilot signal that is used by the receivers to estimate the effective channels. Herein, the reference pilot signal allocated to the reference stream is precoded by the pre-code vector of the reference stream prior to transmission, which corresponds to the allocation of the pre-code vector of the reference stream to the reference pilot signal.

For example, the pilot selector 313 selects a stream predefined in a fixed manner to allocate the reference pilot signal.

As another example, when transmitting the pilot signal through each stream, the pilot selector 313 selects the stream that transmits the pilot signal highest in terms of the sum rate of transmission for all the streams. If there are two streams, the pilot selector 313 estimates the sum rate of transmission for all the streams on the assumption that the pilot signal is transmitted through the first stream. In addition, the pilot selector 313 estimates the sum rate of transmission for all the streams on the assumption that the pilot signal is transmitted through the second stream. Thereafter, the pilot selector 313 compares the estimated sum rates to select the stream, which transmitted the pilot signal highest in terms of the sum rate, as the reference stream to be allocated the reference pilot signal.

Herein, the pilot selector 313 estimates the sum rate by using the channel information of each stream and the noise levels of the receivers.

As another example, the pilot selector 313 selects the stream that transmitted the pilot signal highest in terms of the lowest signal level among the signal levels of the pilot signal received by the receivers through the respective streams. If there are two streams, the pilot selector 313 estimates the signal levels of the pilot signal received by the first and the second receivers through the first stream. In addition, the pilot selector 313 estimates the signal levels of the pilot signal received by the first and the second receivers through the second stream. Thereafter, the pilot selector 313 compares the lower one of the signal levels estimated by the pilot signal received through the first stream with the lower one of the signal levels estimated by the pilot signal received through the second stream. Then, the pilot selector 313 selects the stream, which transmitted the pilot signal highest in terms of the lowest signal level among the lower signal levels, as the reference stream to be allocated the reference pilot signal.

As another example, the pilot selector 313 selects the stream that transmitted the pilot signal highest in terms of the product of the signal levels of the pilot signal received by the receivers through the respective streams. If there are two streams, the pilot selector 313 estimates the signal levels of the pilot signal received by the first and the second receivers through the first stream. In addition, the pilot selector 313 estimates the signal levels of the pilot signal received by the first and the second receivers through the second stream. Thereafter, the pilot selector 313 compares the product of the signal levels of the pilot signal received by the receivers through the first stream with the product of the signal levels of the pilot signal received by the receivers through the second stream. Then, the pilot selector 313 selects the stream, which transmitted the pilot signal highest in terms of the product of the received signal levels, as the reference stream to be allocated the reference pilot signal.

As another example, when transmitting the pilot signal through each stream, the pilot selector 313 selects the stream that transmitted the pilot signal highest in terms of the level of the signals received by the receivers.

The pilot controller 315 controls the pre-coder 305 to allocate the pre-code vector of the stream selected by the pilot selector 313 to the reference pilot signal and to allocate the pre-code vectors of the multiple users to the additional pilot signal. That is, the pilot controller 315 controls the pre-coder 305 to allocate the reference pilot signal to only the stream selected by the pilot selector 313 and to precode the corresponding signal by the pre-code of the selected stream. In addition, the pilot controller 315 controls the pre-coder 305 to allocate the additional pilot signal to the streams of the multiple users served by the receivers and to precode the corresponding signal by the pre-code of each stream.

Each of the RF processors 307-1 to 307-$N_T$ receives a digital signal from the pre-coder 305 and converts the digital signal into an analog signal. Thereafter, each of the RF processors 307-1 to 307-$N_T$ converts the analog signal into an RF signal and transmits the RF signal through the corresponding antenna.

Hereinafter, a description is given of a structure of a receiver for detecting a signal based on a reference pilot signal and an additional pilot signal received from a transmitter.

Figure 4:
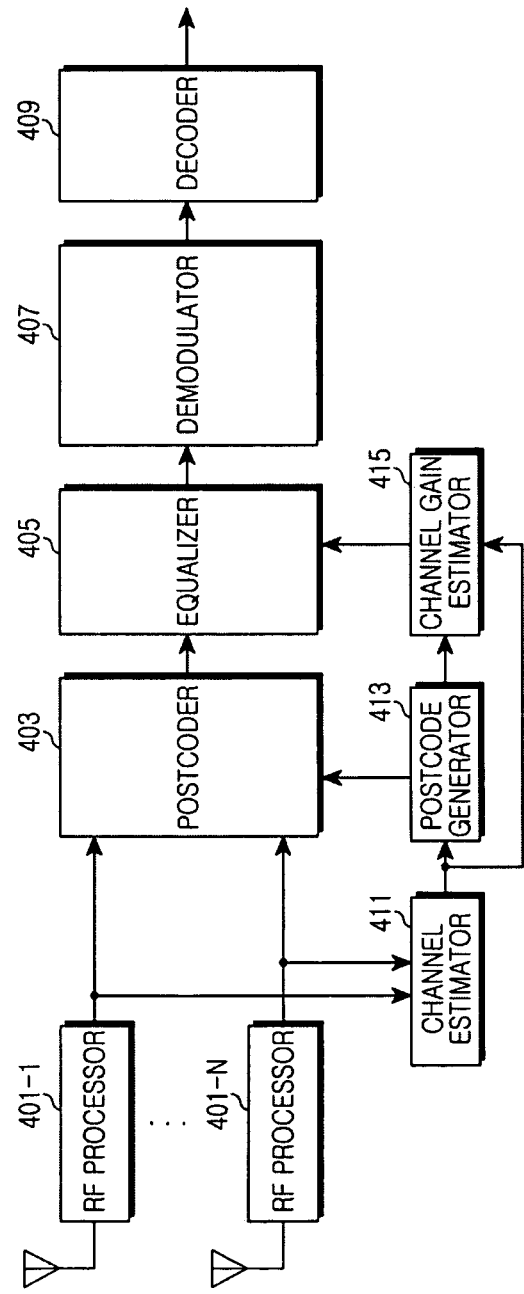
FIG. 4 is a block diagram of a receiver in a wireless communication system according to an exemplary embodiment of the present invention.

FIG. 4 is a block diagram of the receiver in the wireless communication system according to an exemplary embodiment of the present invention.

Referring to FIG. 4, the receiver includes RF processors 401-1 to 401-$N_R$, a postcoder 403, an equalizer 405, a demodulator 407, a decoder 409, a channel estimator 411, a postcode generator 413, and a channel gain estimator 415.

Each of the RF processors 401-1 to 401-$N_R$ receives an RF signal through each antenna and converts the RF signal into a baseband signal. Thereafter, each of the RF processors 401-1 to 401-$N_R$ converts the baseband signal into a digital signal and outputs the digital signal.

The channel estimator 411 receives signals from the RF processors 401-1 to 401-$N_R$ and estimates a channel with respect to the transmitter based on a pilot signal included in the received signals. Herein, the channel estimator 411 estimates an effective channel based on the reference pilot signal and provides the estimated effective channel to the postcode generator 413. In addition, the channel estimator 411 estimates an effective channel based on the additional pilot signal and provides the estimated effective channel to the channel gain estimator 415. As another example, if the pre-code of the reference stream is not included in the additional pilot signal, the channel estimator 411 may provide an effective channel estimated by the reference pilot signal and the additional pilot signal to the channel gain estimator 415.

The postcode generator 413 receives the estimated effective channel from the channel estimator 411, and generates a postcode based on the received effective channel. For example, if the channel estimator 411 estimates the channel based on the reference pilot signal allocated to its own stream, the postcode generator 413 recognizes the matched filter as the postcode that provides the maximum Signal to Interference and Noise Ratio (SINR).

On the other hand, if the channel estimator 411 estimates a channel based on the reference pilot signal allocated to another stream that is not its own stream, the postcode generator 413 receives the estimated effective channel from the channel estimator 411 and generates a vector orthogonal to the received effective channel. For example, when receiving a channel of $[\alpha \beta]^T$ from the channel estimator 411, the postcode generator 413 generates a vector of $[-\beta^* \alpha]^T$ orthogonal to the channel.

Thereafter, the postcode generator 413 generates a matched filter based on the orthogonal vector. Herein, the postcode generator 413 recognizes the matched filter as the postcode that provides the maximum SINR.

The channel gain estimator 415 estimates an effective channel gain based on the effective channel received from the channel estimator 411 and the postcode vector received from the postcode generator 413. For example, if the channel estimator 411 estimates a channel based on the reference pilot signal allocated to its own stream, the channel gain estimator 415 estimates an effective channel gain as shown in Equation (1) below. Herein, Equation (1) assumes that the stream transmitting a signal to the first receiver is selected as the reference stream.

$$\alpha_1 = \tilde{w}_1^H y_{1,D1} = \|H_1 m_1\| \qquad (1)$$

where $\alpha_1$ denotes the effective channel gain estimated by the first receiver, $\tilde{w}_1$ denotes the postcode vector of the first receiver, and $y_{1,D1}$ denotes the effective channel estimated by the first receiver based on the reference pilot signal.

The channel gain estimator 415 determines the effective channel gain based on the postcode vector and the effective channel estimated through the reference pilot signal, as shown in Equation (1). Herein, if the pre-code of the reference pilot signal is included in the additional pilot signal, even if the channel estimator 411 estimates a channel based on the reference pilot signal allocated to its own stream, the channel gain estimator 415 may determine an effective channel gain as shown in Equation (2) below.

On the other hand, if the channel estimator 411 estimates a channel based on the reference pilot signal allocated to another stream that is not its own stream, the channel gain estimator 415 determines an effective channel gain as shown in Equation (2). Herein, Equation (2) assumes that the stream transmitting a signal to the first receiver is selected as the reference stream.

$$\alpha_2 = \tilde{w}_2^H y_{2,D2} \qquad (2)$$
$$= (w_2^H e^{-j\phi_2})(H_2\{m_2 + m_3 + m_4\} + n_2)$$
$$= \|H_2 m_2\| \cdot e^{-j\phi_k}$$

where $\alpha_2$ denotes the effective channel gain estimated by the second receiver, $y_{2,D2}$ denotes the effective channel estimated by the second receiver based on the additional pilot signal, $m_i$ denotes the pre-code vector of the $i^{th}$ receiver (where i includes 2, 3 and 4 and may include 1, 2, 3 and 4), $e^{j\phi_2}$ denotes a phase error, and $\tilde{w}_2$ denotes the postcode vector generated by the second receiver based on the vector orthogonal to the effective channel estimated based on the reference pilot signal allocated to the reference stream of the first receiver.

Thus, $\tilde{w}_2$ may include a phase error as shown in Equation (3) below.

The additional pilot signal includes not only the effective channel of the corresponding receiver but also the effective channels of other receivers, as shown in Equation (2). However, the postcode received from the postcode generator 413 is used to eliminate the effective channels of other receivers, thereby estimating only the channel gain of the corresponding receiver.

$$\tilde{w}_2 = w_2 \cdot e^{-j\phi_2} \qquad (3)$$

where $\tilde{w}_2$ denotes the postcode vector generated by the second receiver based on the vector orthogonal to the effective channel estimated based on the reference pilot signal allocated to the reference stream of the first receiver, $w_2$ denotes the postcode vector of the second receiver, and $e^{j\phi_2}$ denotes a phase error.

Since the postcode vector includes a phase error as shown in Equation (3), the channel gain generated based on the postcode vector also includes a phase error. Herein, the phase error is offset when the postcoder 403 and the equalizer 405 detect a signal based on the postcode and the channel gain.

The postcoder 403 receives the postcode from the postcode generator 413 and uses the received postcode to postcode the RX signals received from the RF processors 401-1 to 401-$N_R$, thereby reducing the interference with signals intended for other receivers.

The equalizer 405 receives the channel gain from the channel gain estimator 415 and uses the received channel gain to equalize the signal received from the postcoder 403, thereby compensating for the channel distortion of the corresponding receiver.

The demodulator 407 receives the signal from the equalizer 405 and demodulates the received signal according to the corresponding modulation level. Herein, the modulation level includes an MCS level.

The decoder 409 receives the signal from the demodulator 407 and decodes the received signal according to the corresponding modulation level to detect the original data.

Hereinafter, a description is given of an operation for the transmitter to transmit the reference pilot signal and the additional pilot signal.

Figure 5:
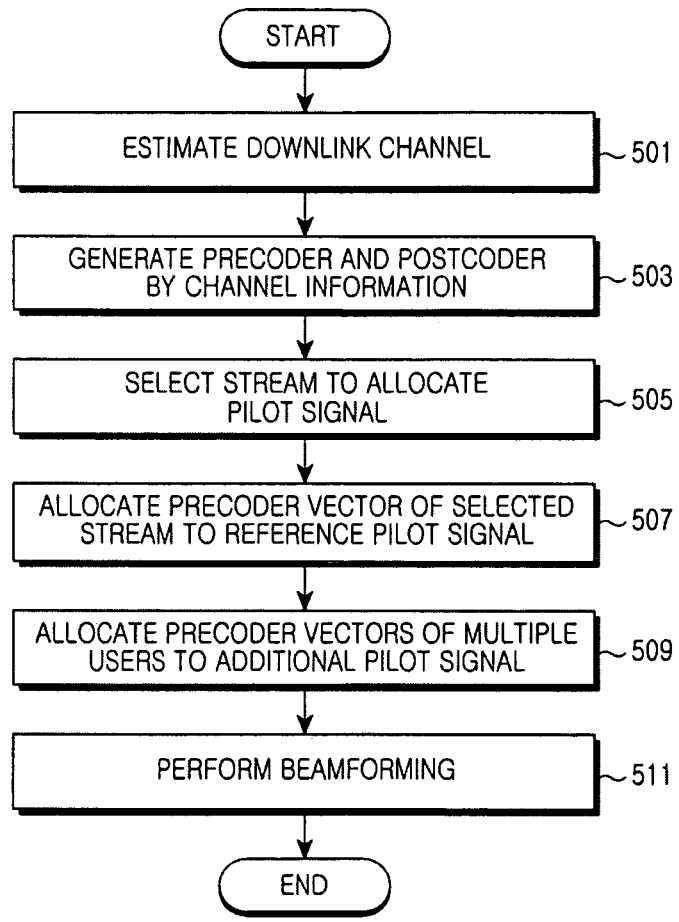
FIG. 5 is a flowchart illustrating a process for a transmitter to transmit a signal in a wireless communication system according to an exemplary embodiment of the present invention.

FIG. 5 is a flowchart illustrating a process for a transmitter to transmit a signal in a wireless communication system according to an exemplary embodiment of the present invention.

Referring to FIG. 5, in step 501, the transmitter detects downlink channel information of the receivers enabled in the service area. For example, the transmitter may estimate each downlink channel based on a sounding signal transmitted by the receivers. As another example, the transmitter may detect each downlink channel from channel state information fed back from the receivers.

Thereafter, in step 503, the transmitter generates a pre-code and a postcode for each stream based on the channel information. Herein, the transmitter generates the pre-code and the postcode so that the effective channels estimated by the receivers based on the precoded signal are orthogonal to each other.

Thereafter, in step 505, the transmitter selects a reference stream for allocation of a pre-code vector to a reference pilot signal. For example, the transmitter selects a stream pre-defined in a fixed manner to allocate the reference pilot signal. As another example, when transmitting the pilot signal through each stream, the transmitter selects the stream that transmits the pilot signal highest in terms of the sum rate of transmission for all the streams. As another example, the transmitter selects the stream that transmitted the pilot signal highest in terms of the lowest signal level among the signal levels of the pilot signal received by the receivers through the respective streams. As another example, the transmitter selects the stream that transmitted the pilot signal highest in terms of the product of the signal levels of the pilot signal received by the receivers through the respective streams. As another example, when transmitting the pilot signal through each stream, the transmitter selects the stream that transmitted the pilot signal highest in terms of the level of the signals received by the receivers.

Thereafter, in step 507, the transmitter allocates the pre-code vector of the selected stream to the reference pilot signal. Herein, the reference pilot signal allocated to the selected stream is precoded by the pre-code vector of the reference stream prior to transmission, which corresponds to the allocation of the pre-code vector of the reference stream to the reference pilot signal.

Thereafter, in step 509, the transmitter allocates the pre-code vectors of multiple users served to an additional pilot signal. For example, the transmitter allocates the pre-code vectors of all the users served by the receivers to the additional pilot signal. As another example, the transmitter allocates the pre-code vectors of other users than the users allocated the reference pilot signal, among all the users served by the receivers, to the additional pilot signal.

Thereafter, in step 511, the transmitter precodes the reference pilot signal, the additional pilot signal and the data based on the pre-codes generated in step 503, and transmits the results to the receivers. That is, the transmitter performs a beamforming operation on the receivers based on the pre-codes generated in step 503.

Thereafter, the transmitter ends the process.

Hereinafter, a description is given of an operation for a receiver to detect a signal based on a reference pilot signal and an additional pilot signal received from a transmitter.

Figure 6:
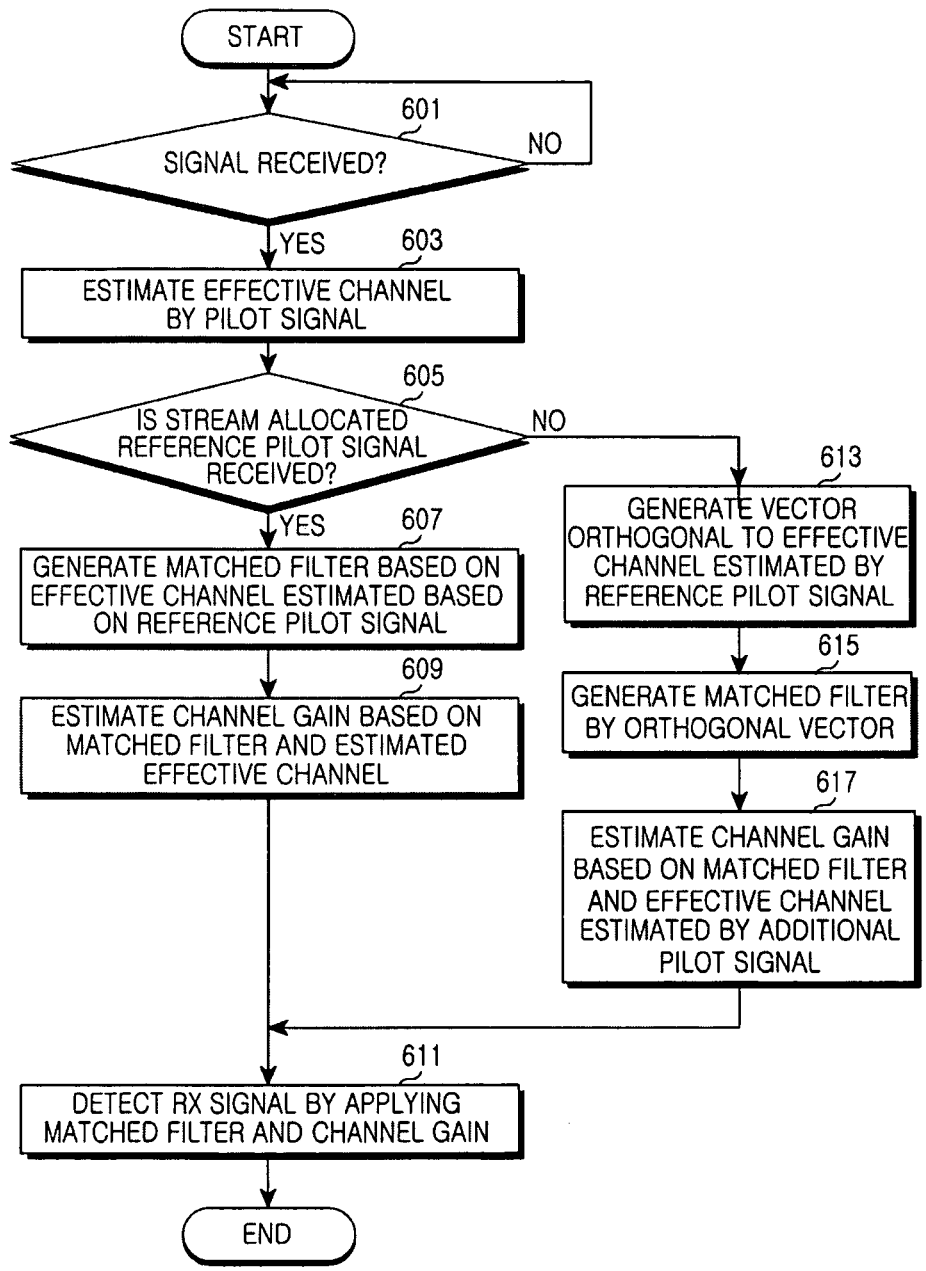
FIG. 6 is a flowchart illustrating a process for a receiver to estimate an effective channel in a wireless communication system according to an exemplary embodiment of the present invention.

FIG. 6 is a flowchart illustrating a process for a receiver to estimate an effective channel in a wireless communication system according to an exemplary embodiment of the present invention.

Referring to FIG. 6, in step 601, the receiver determines if a signal is received from the transmitter.

If so, the receiver proceeds to step 603. In step 603, the receiver estimates a channel based on the pilot signals included in the received signal. Herein, the receiver estimates an effective channel based on the reference pilot signal including the pre-code vector of the reference stream, and estimates an effective channel based on the additional pilot signal including the pre-code vectors of the multiple users.

Thereafter, in step 605, the receiver determines if its own data is received from the transmitter through the stream allocated the reference pilot signal.

If the receiver determines that its own data is received from the transmitter through the stream allocated the reference pilot signal, the receiver proceeds to step 607. In step 607, the receiver generates a matched filter based on the effective channel estimated in step 603 based on the reference pilot signal. Herein, the receiver recognizes the matched filter as the postcode that provides the maximum SINR.

Thereafter, in step 609, the receiver estimates a channel gain based on the matched filter and the effective channel estimated in step 603. For example, if the pre-code of the stream allocated the reference pilot signal is not included in the additional pilot signal, the receiver estimates a channel gain as shown in Equation (1) based on the matched filter and the effective channel estimated based on the reference pilot signal. As another example, if the pre-code of the stream allocated the reference pilot signal is included in the additional pilot signal, the receiver may estimate a channel gain based on the matched filter and the effective channel estimated based on the additional pilot signal.

Thereafter, in step 611, the receiver detects RX data by applying the matched filter and the channel gain to the received signal. For example, the receiver uses the matched filter to postcode the received signal, thereby reducing the interference with signals intended for other receivers. Thereafter, based on the channel gain, the receiver equalizes the postcoded signal to compensate for the channel distortion of its own signal, thereby detecting the RX data.

On the other hand, if its own data is not received through the stream allocated the reference pilot signal (in step 605), the receiver proceeds to step 613. In step 613, the receiver generates a vector orthogonal to the effective channel estimated in step 603 based on the reference pilot signal. For example, if the channel estimated based on the reference pilot signal is $[\alpha \beta]^T$, the receiver generates a vector of $[-\beta^* \alpha]^T$ orthogonal to the estimated channel.

Thereafter, in step 615, the receiver generates a matched filter based on the vector orthogonal to the effective channel. Herein, the receiver recognizes the matched filter as the postcode that provides the maximum SINR.

Thereafter, in step 617, the receiver estimates a channel gain based on the matched filter and the effective channel estimated in step 603 based on the additional pilot signal. Herein, the additional pilot signal includes not only the effective channel of the corresponding receiver but also the effective channels of other receivers. Thus, the receiver uses the matched filter to eliminate the effective channels of other receivers, thereby estimating only its own channel gain.

Thereafter, in step 611, the receiver detects RX data by applying the matched filter and the channel gain to the received signal. For example, the receiver uses the matched filter to postcode the received signal, thereby reducing the interference with signals intended for other receivers. Thereafter, based on the channel gain, the receiver equalizes the postcoded signal to compensate for the channel distortion of its own signal, thereby detecting the RX data.

Thereafter, the receiver ends the process.

In the above exemplary embodiments, the transmitter may reduce pilot overhead by allocating an additional pilot signal including the pre-code vectors of multiple users and the reference pilot signal of a number of streams that is one less than the number of the antennas of the receiver.

In another exemplary embodiment, the transmitter may reduce the pilot overhead by using only the common pilot signal.

According to exemplary embodiments of the present invention described above, the transmitter of the multi-antenna system transmits signals by allocating the pilot signal including the pre-codes of the multiple users and the pilot signal for the reference pre-code vector, thereby making it possible to reduce pilot overhead and increase the spectral efficiency.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for detecting a signal at a receiver of a multi-antenna system, the method comprising:
   estimating a channel based on a reference pilot signal received through one of at least two streams and estimating a channel based on an additional pilot signal shared by the at least two streams;
   if the reference pilot signal is not allocated to a stream intended for the receiver:
      generating a vector orthogonal to the channel estimated based on the reference pilot signal,
      generating a first postcode based on the orthogonal vector,
      estimating a first channel gain based on the first postcode and the channel estimated based on the additional pilot signal, and
      detecting the signal based on the first postcode and the first channel gain; and
   if the reference pilot signal is allocated to a stream intended for the receiver:
      generating a second postcode based on the channel estimated based on the reference pilot signal,
      estimating a second channel gain based on the second postcode and one of the channel estimated based on the reference pilot signal and the channel estimated based on the additional pilot signal, and
      detecting the signal based on the second postcode and the second channel gain.

2. The method of claim 1, wherein the first postcode comprises values for a matched filter that are generated based on the orthogonal vector.

3. The method of claim 1, wherein detecting the signal comprises:
   postcoding a received signal by using one of the first postcode and the second postcode; and
   equalizing the postcoded received signal based on one of the first channel gain and the second channel gain.

4. The method of claim 1, wherein the estimating of the second channel gain based on the second postcode and one of the channel estimated based on the reference pilot signal and the channel estimated based on the additional pilot signal comprises:
   estimating the second channel gain based on the second postcode and the channel estimated based on the reference pilot signal.

5. The method of claim 1, wherein the estimating of the second channel gain based on the second postcode and one of the channel estimated based on the reference pilot signal and the channel estimated based on the additional pilot signal comprises:

estimating the second channel gain based on the second postcode and the channel estimated based on the additional pilot signal.

6. A receiving apparatus of a multi-antenna system, the apparatus comprising:

a channel estimator configured to estimate a channel based on a reference pilot channel signal received through one of at least two streams and configured to estimate a based on an additional pilot signal shared by the at least two streams;

a postcode generator configured to generate a first postcode based on a vector orthogonal to the channel estimated based on the reference pilot signal, if the reference pilot signal is not allocated to a stream intended for the receiving apparatus, and configured to generate a second postcode based on the channel estimated based on the reference pilot signal, if the reference pilot signal is allocated to a stream intended for the receiving apparatus;

a channel gain estimator configured to estimate a channel gain based on one of the first postcode and the second postcode, and one of the channel estimated based on the reference pilot signal and the channel estimated based on the additional pilot signal;

a postcoder configured to postcode a received signal based on one of the first post code and the second postcode; and an equalizer configured to equalize the postcoded received signal based on the estimated channel gain.

7. The apparatus of claim 6, wherein the postcode generator generates values for a matched filter that are based on the orthogonal vector.

8. The apparatus of claim 6, wherein if the reference pilot signal is allocated to the stream intended for the receiving apparatus, the channel gain estimator estimated the channel gain based on a postcode equal to the first postcode and the channel estimated based on the additional pilot signal, or estimated the channel gain based on the second postcode and one of the channel estimated based on the reference pilot signal and the channel estimated based on the additional pilot signal.

* * * * *